US006807615B1

(12) United States Patent
Wong et al.

(10) Patent No.: US 6,807,615 B1
(45) Date of Patent: Oct. 19, 2004

(54) APPARATUS AND METHOD FOR PROVIDING A CYCLIC BUFFER USING LOGICAL BLOCKS

(75) Inventors: Thomas K. Wong, Pleasanton, CA (US); Panagiotis Tsirigotis, Mountain View, CA (US); Rajeev Chawla, Fremont, CA (US); Omid Ahmadian, Menlo Park, CA (US); Sanjay R. Radia, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/288,023

(22) Filed: Apr. 8, 1999

(51) Int. Cl.$^7$ .............................................. G06F 13/00
(52) U.S. Cl. ...................... 711/202; 711/209; 711/110; 710/52
(58) Field of Search ......................... 710/52; 711/109, 711/110, 202, 206, 207, 209

(56) References Cited

U.S. PATENT DOCUMENTS

| | | | | | |
|---|---|---|---|---|---|
| 4,482,952 | A | * | 11/1984 | Akagi | 711/206 |
| 5,109,335 | A | * | 4/1992 | Watanabe | 711/3 |
| 5,535,412 | A | * | 7/1996 | Nadehara | 711/110 |
| 5,574,944 | A | * | 11/1996 | Stager | 710/5 |
| 5,603,008 | A | * | 2/1997 | Hilton et al. | 711/164 |
| 5,826,041 | A | * | 10/1998 | Ogus | 709/234 |
| 5,946,717 | A | * | 8/1999 | Uchibori | 709/234 |

FOREIGN PATENT DOCUMENTS

| EP | 0864967 | * | 9/1998 |
|---|---|---|---|
| WO | WO 88 09014 A | | 11/1988 |

OTHER PUBLICATIONS

"Direct Memory Access for Multiple Requesting Computer Devices," IBM Technical Disclosure Bulletin, U.S., IBM Corp., New York, vol. 31, No. 11, Apr. 1, 1989, pp. 324–328.
"Concepts for Buffer Storage", Computer Group News, vol. 2, No. 8, Mar. 1969, pp. 9–13.

* cited by examiner

Primary Examiner—Glenn Gossage
(74) Attorney, Agent, or Firm—Finnegan Henderson Farabow Garrett & Dunner, L.L.P.

(57) ABSTRACT

An apparatus and method for creating and maintaining a cyclic or circular buffer are implemented using logical blocks corresponding to the physical blocks of the buffer. The logical blocks are mapped to the physical blocks of the cyclic buffer, and are used to create an index table for the buffer. Each entry in the index table corresponds to one or more blocks in the buffer, and has a logical block number respectively associated with a buffer block. When information from the buffer is accessed, the index table is consulted to determine if the requested information is stored in the buffer. If the information is stored in the buffer, the logical block number corresponding to the information is retrieved from the entry and translated into a corresponding physical block number. Using logical block numbers allows simple determination of whether the buffer block is valid, and how new or fresh the buffer block is without requiring a generation or cycle number.

36 Claims, 8 Drawing Sheets

| PHYS BLK NBR | 0 | 1 | ... | N-3 | N-2 | N-1 |
|---|---|---|---|---|---|---|
| LOG BLK NBR | N | N+1 | ... | 2N-3 | 2N-2 | 2N-1 |
| | 2N | 2N+1 | ... | 3N-3 | 3N-2 | 3N-1 |

218

APPARATUS AND METHOD FOR PROVIDING A CYCLIC BUFFER USING LOGICAL BLOCKS

I. BACKGROUND OF THE INVENTION

A. Field of the Invention

The present invention relates generally to buffers, and in particular to an apparatus and method for creating and maintaining a cyclic or circular buffer.

B. Description of the Prior Art

A buffer is a memory area used for storing information being transferred between two entities. It is often used to decouple concurrently executing software processes so that a process reading from the buffer and a process writing to the buffer may operate at different speeds or on different block sizes of information stored in the buffer. An input pointer is used to identify a location in the buffer to write information.

A cyclic or circular buffer is a special type of buffer that uses a cyclic addressing scheme. Data is input to the buffer at the buffer location pointed to by the input pointer. The input pointer is incremented each time data is input to the buffer. When the input pointer reaches the end of the buffer, it is wrapped around to the beginning of the buffer. Thus, when wraparound occurs, data at the beginning of the buffer starts being overwritten.

A cyclic buffer typically contains blocks of equal size. The size of the buffer is the number of blocks in the buffer. A cyclic buffer is implemented using an input pointer and a cycle number. The input pointer points to the block in the buffer where new input information will be stored, and the cycle number indicates the number of times the input pointer has wrapped around the buffer. Each cycle is referred to as a generation. Thus, if the input pointer has already cycled through the buffer twice, information being added in the next cycle is considered to be third generation information.

Before adding information to the buffer, it is necessary to allocate an appropriate number of blocks to hold the information being input to the buffer. In some cyclic buffer implementations the allocated blocks must be contiguous in the buffer, and therefore cannot be allocated from the bottom and top of the buffer. It is not possible to allocate an area in a cyclic buffer that wraps around the buffer. Thus, if there are N blocks from the input pointer to the end of the cyclic buffer, then an allocation of more than N blocks must start from block number 0. This is an inefficient use of buffer space.

A cyclic buffer is useful for storing information that must be retrieved quickly. For example cyclic buffers are used to store USENET news articles. See, Fritchie, Scott L., "The Cyclic News Filesystem: Getting INN to Do More with Less," Proceedings of the Eleventh System Administration Conference (LISA XI) San Diego, Calif., October 1997, pp. 99–111.

A cyclic buffer is also useful for storing information that expires after a relatively brief period of time. If the size of a cyclic buffer is large, information being overwritten may already be expired.

Indexes are often used to locate information stored in a cyclic buffer. An index table for a cyclic buffer is a collection of one or more index entries. Each index entry (or index) comprises a key value identifying particular information and the location of the information in the buffer. To find certain information in the buffer, the index table is first scanned to find an index entry with a key value associated with the desired information. Once an index entry with a proper key is found, the information location in the entry is used to locate the information in the buffer. The index must be modified each time information is added to or deleted from the buffer. For example, the index entry for the deleted information might be removed, or identified as obsolete.

Since information is added into the cyclic buffer contiguously, old information is never updated. Instead, a new copy of the information is written to the cyclic buffer, and the location information of the index that identifies the information is updated to point to the new location. In addition, if the information is overwritten, the index entry for the overwritten information must either be removed, or identified as obsolete. It is preferable to remove the obsolete index to recover the memory space occupied by the index entry. Unfortunately, locating the indexes of information stored in a cyclic buffer that has been overwritten is quite complicated and is also quite time-consuming. Thus, it is preferable to use a method that can identify an obsolete index when it is referenced.

In order to determine whether a buffer block has been overwritten, the location information of an index entry must also contain the cycle number of the cyclic buffer when the buffer block is allocated. When the index is referenced, the cycle number in the index and the current cycle number of the cyclic buffer are then used to determine if the buffer block has been overwritten.

Thus, conventional cyclic buffers require both a cycle number (or generation number) and a block number of a block to determine if the contents of the block have been overwritten. The requirement of both a cycle number and block number, and the algorithms that must be implemented to use them, make a conventional cyclic buffer very cumbersome. There is, therefore, a need for a cyclic buffer that is simpler, requires less space when implemented, and allows blocks to be wrapped around the buffer.

II. SUMMARY OF THE INVENTION

Systems and methods consistent with the present invention maintain and use a cyclic buffer using logical blocks. Logical blocks and physical blocks have the same size. A buffer manager maps logical buffer blocks to physical buffer blocks for storing information to and retrieving information from the buffer.

New data being stored in the buffer is placed in a sequence of contiguous logical blocks. Such a sequence is called a cell. There is an exceptional case when a cell consists of exactly two sequences of contiguous logical blocks, if the first sequence includes the logical block with the highest possible number, and the second sequence includes the logical block with the lowest possible number.

The logical block number of the first logical block of a cell, and the size of the cell in bytes are stored in the index table with information identifying the new data.

The buffer manager accesses the buffer contents by consulting the index to determine the logical blocks associated with desired information, and maps logical block numbers to physical buffer blocks. The logical block numbers allow the buffer manager to simply determine the newness of a logical buffer block, as well as whether the block is obsolete.

Such systems and methods overcome the problems of conventional cyclic buffers described above. Additional advantages of the invention are apparent from the description which follows, and may be learned by practice of the invention. It is to be understood that both the foregoing general description and the following detailed description are exemplary and explanatory only and are not restrictive of the invention, as claimed.

III. BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings, FIG. 1 is a block diagram showing a system in which a cyclic buffer consistent with the principles of the invention may be implemented;

Figure 6:
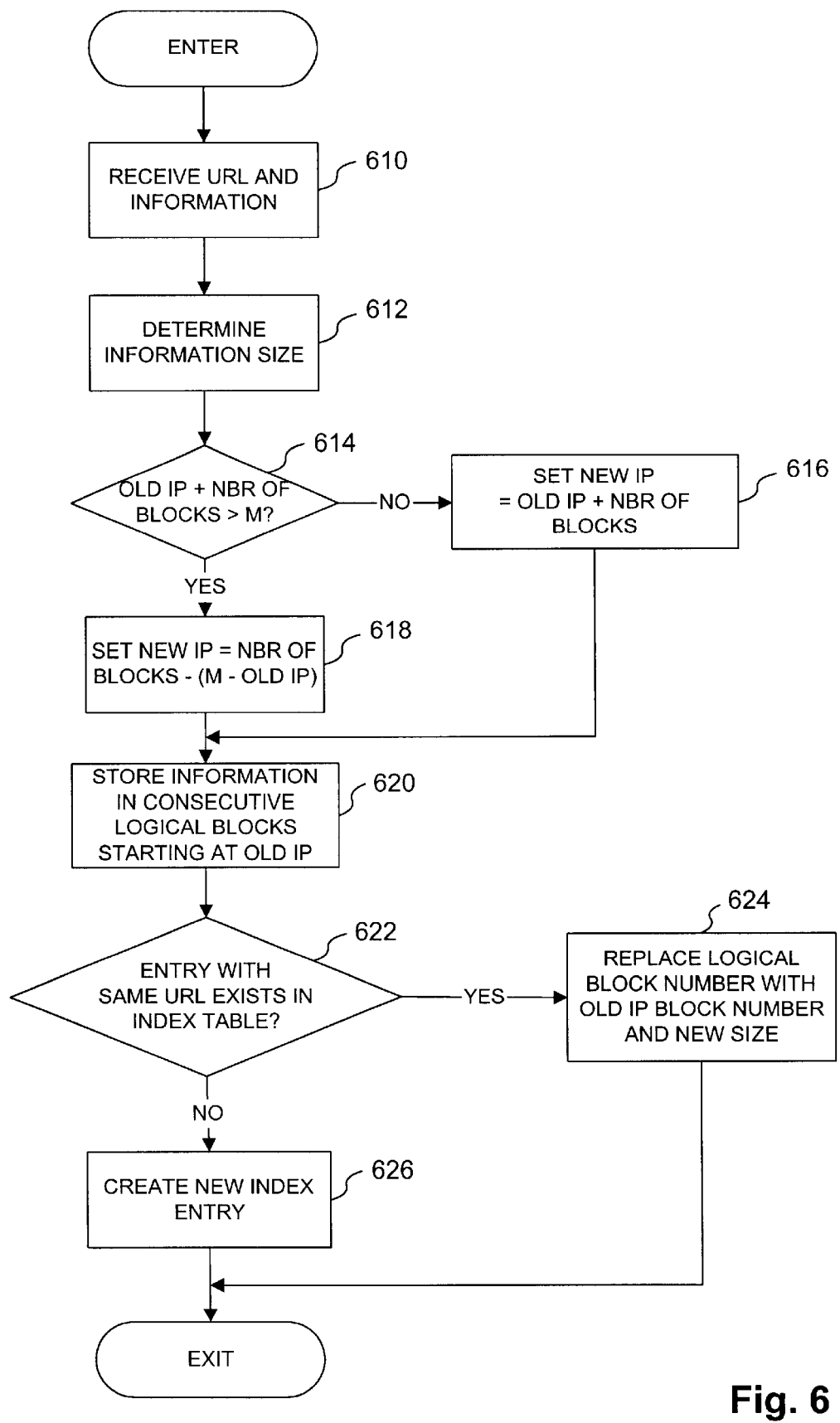
Figure 7:
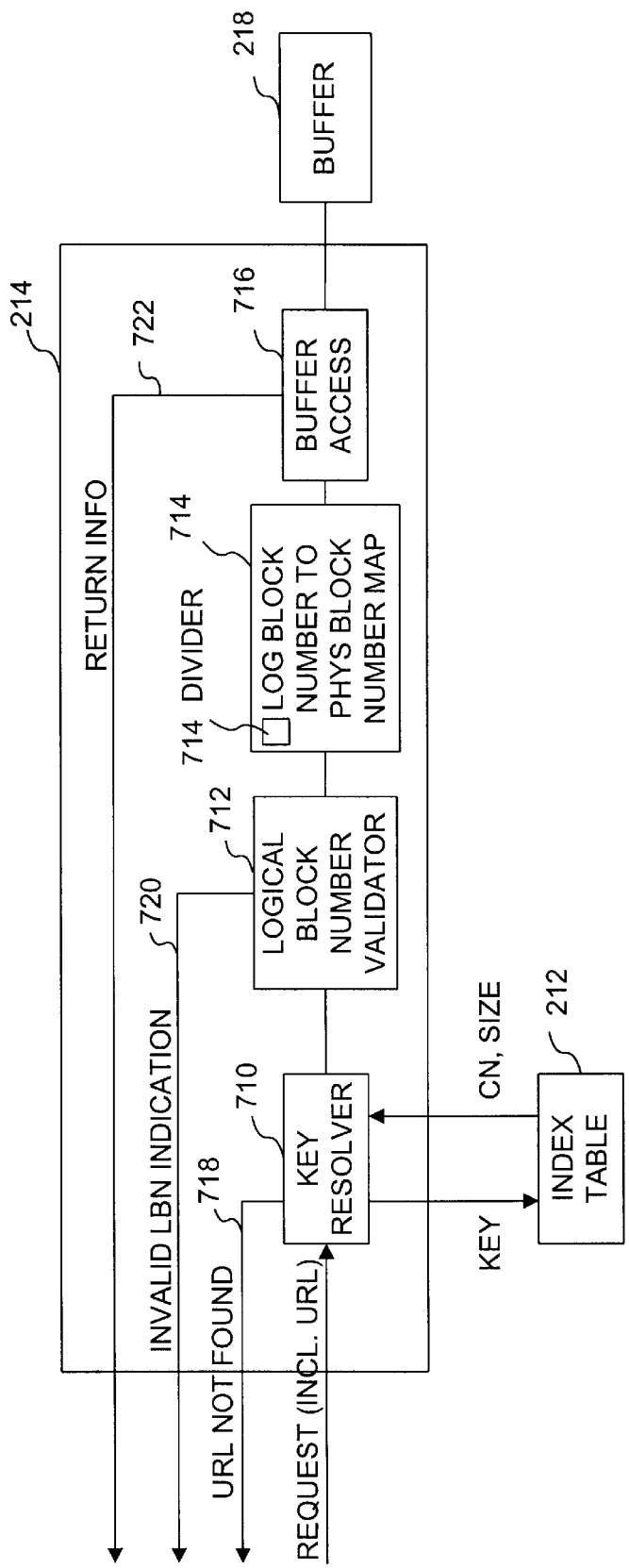
Figure 8:
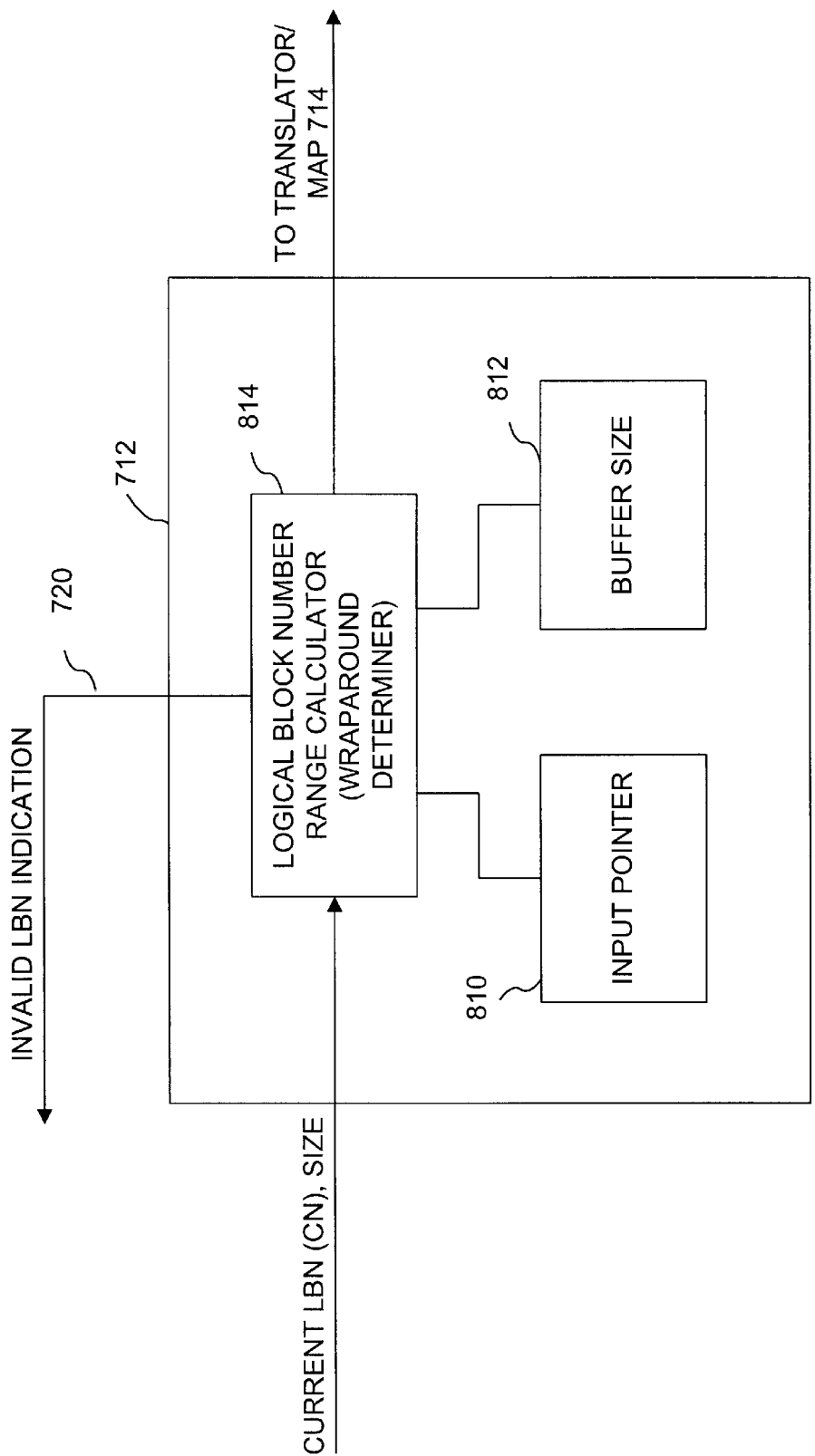
Figure 9:
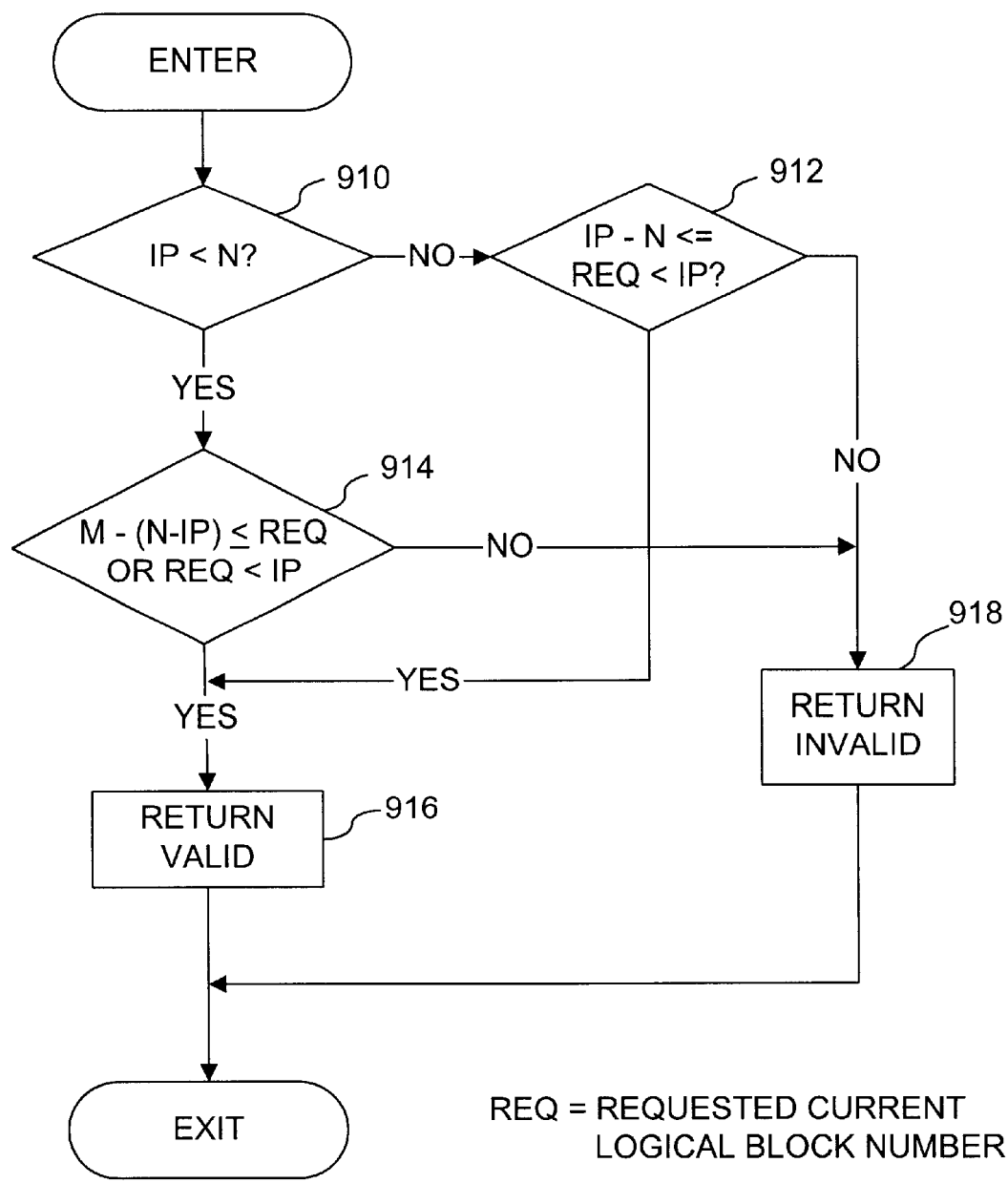

FIG. 6 is a flow chart showing the process of buffer controller 214 when inserting new information into buffer 218 that has been retrieved by proxy server controller 210 from network 116;

FIG. 7 is a block diagram showing a portion of buffer controller 214 that retrieves information from buffer 218;

FIG. 8 is a block diagram showing block number validator 712 in greater detail; and FIG. 9 is a flow chart showing the processing performed by block number validator 712.

IV. DETAILED DESCRIPTION

Systems and methods consistent with the improved cyclic buffer disclosed herein use an index to map consecutively numbered logical blocks to physical buffer blocks of a cyclic buffer. The index to the cyclic buffer is implemented using the logical block numbers. When new information is added to the cyclic buffer, the next logical block number is assigned to the information. The new logical block number corresponds to a physical cyclic buffer block. The new logical block number and key associated with the information are then added to the index. The mapping of logical block numbers to physical block numbers may simply be a mathematical formula that defines the relationship between the logical block numbers and physical block numbers.

To retrieve information from the cyclic buffer, the index is first scanned to determine whether an index entry exists that has a key associated with the information. If such a key is present, the entry is accessed to determine the logical block number associated with the key. The logical block number is then mapped to a physical block number, and the physical block number is used to access the cyclic buffer.

In one implementation, a logical block number C is converted into a physical block number by determining a remainder after dividing the block number C by the number of blocks N in the buffer (i.e., C/N). The logical block number can be used to determine which blocks are the newest, as well as whether the block is valid. The newest block is the block having the highest logical block number. The block is a valid block if the logical block number being requested is within the range of logical block numbers currently being used to implement the buffer. Thus, logical block numbers are used to both identify the blocks within a cyclic buffer and to determine whether a block has been overwritten (i.e., is invalid).

In one implementation of a cyclic buffer consistent with the invention, a caching proxy server retrieves information from a network and stores the information in the cyclic buffer using a logical block buffer control mechanism. This allows the information to be accessed at a later time without retrieving it from the network.

System

Figure 1:
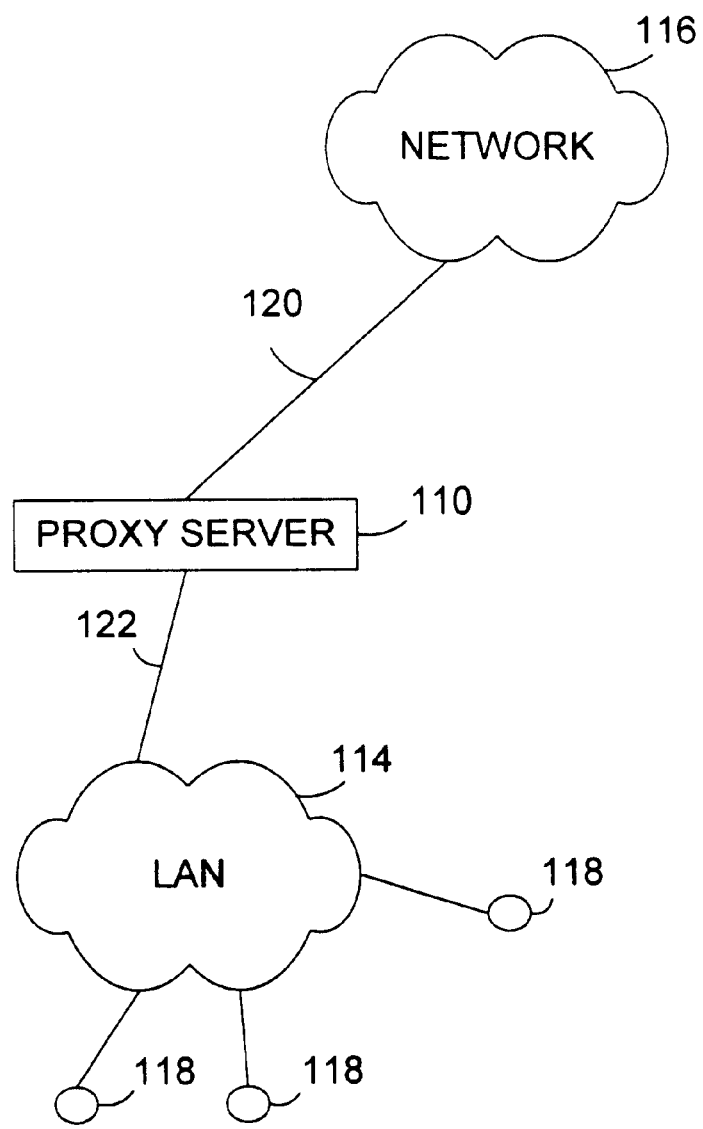

FIG. 1 is a block diagram showing a system in which a logical block cyclic buffer consistent with the principles of the invention may be implemented. Proxy server 110 is connected between local area network (LAN) 114 and network 116, such as a wide area network or the Internet. Users 118 are connected to LAN 114. In response to requests for information from user 118, proxy server 110 retrieves the information from network 116 via path 120, and forwards the information to a user or requestor 118 via path 122 and LAN 114. The information retrieved from network 116 is also buffered by proxy server 110 for later use. Buffering the information allows proxy server 110 to immediately provide the information at a later time if it is requested again.

Figure 2:
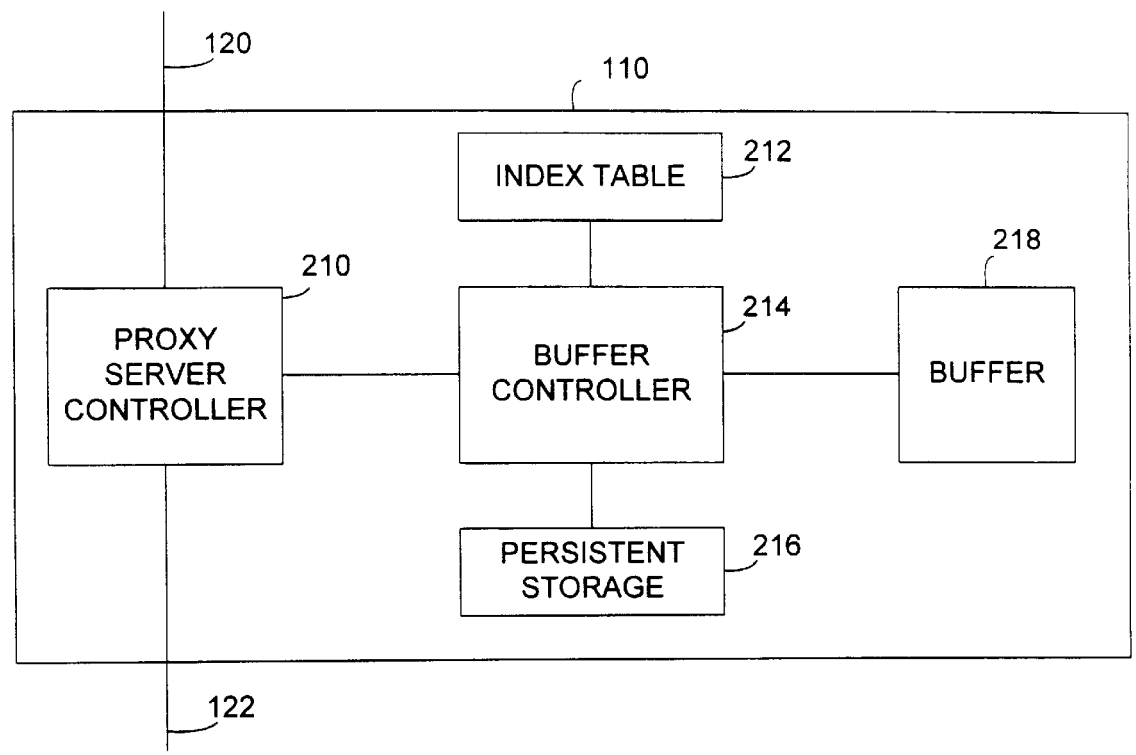
FIG. 2 is a block diagram showing proxy server 110 in greater detail.

FIG. 2 is a block diagram showing proxy server 110 in greater detail. Proxy server 110 may be implemented using a computer, as is well understood in the art. The blocks shown in FIG. 2 may be implemented in hardware, software, or a combination of hardware and software.

Proxy server 110 is controlled by proxy server controller 210, which is connected to buffer controller 214. Buffer controller 214 is connected to an index table 212, a buffer 218 and a persistent storage 216. Proxy server controller 210 receives requests for information over path 122 from users 118 (FIG. 1) connected to LAN 114. Proxy server controller 210 sends the request to buffer controller 214. Buffer controller 214 accesses index table 212 to determine whether the requested information is present in buffer 218. If the entries of index table 212 indicate that the information is present in buffer 218, buffer controller 214 retrieves the information from buffer 218 and returns it to proxy server controller 210. Proxy server controller 210 in turn returns the information to the user 118 that requested the information.

If buffer controller 214 determines from index table 212 that buffer 218 does not contain the requested information, an indication that the information is not buffered is sent to proxy server controller 210. Proxy server controller 210 responds to the indication by retrieving the requested information from network 116 over path 120. Upon receiving the requested information from network 116, proxy server controller 210 returns the requested information over path 122 to the user 118 requesting the information. Proxy server controller 210 also forwards the information to buffer controller 214. Buffer controller 214 stores the information in buffer 218 and updates index table 212 to reflect the new information in buffer 218.

Buffer controller 214 uses persistent storage 216 to back up information stored in index table 212 and buffer 218 when the system is down, such as when it crashes or is shut down. This allows the buffer and index information to be maintained while the system is down. When the system is restarted, buffer controller 214 restores the contents of index table 212 and buffer 218 by loading each with the saved index and buffer information from persistent storage 216. This allows proxy server 110 to restart in the state it was in prior to shutdown.

In one implementation, buffer controller 214 implements a logical block cyclic buffer, and maintains index table 212 in response to information being stored in buffer 218. Index table 212 is updated using logical block numbers consistent with the principles of the invention.

Logical Blocks

Figure 3:
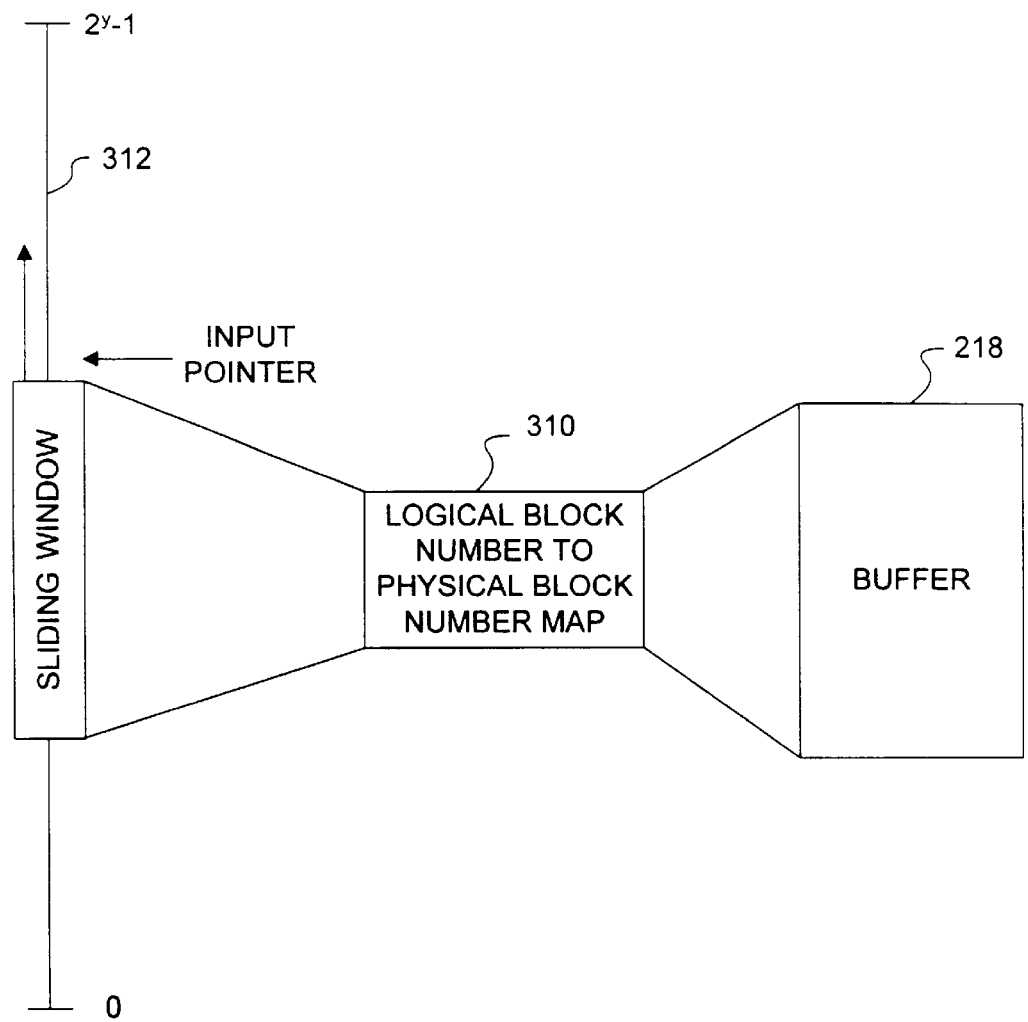
FIG. 3 is a block diagram showing the relationship between the logical block number and the physical blocks in buffer 218.

FIG. 3 is a block diagram showing the relationship between a logical block number range 312 and buffer blocks in buffer 218. Logical block number range 312 is equal to $2^y$, where y is the number of bits used to represent the logical block numbers. As illustrated in FIG. 3, at any one time certain logical block numbers ("sliding window") in logical block number range 312 represent, and can be mapped to, respective blocks of buffer 218 using logical block number to physical block number map 310. When new information is stored in a block of buffer 218 the next logical block number, identified in FIG. 3 by "input pointer," is used to represent that logical block number. In this way, certain logical block numbers in block number range 312 represent, and can be mapped to, respective blocks of buffer 218. Therefore, the logical block numbers within the sliding window are the only valid logical block numbers because they are all mapped to corresponding blocks in buffer 218.

Figures 4, 5:
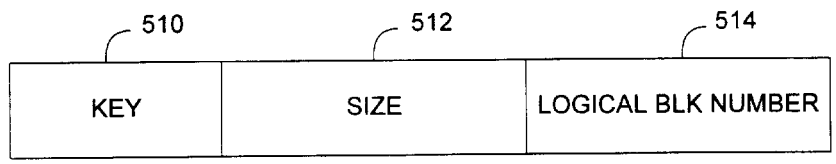
FIG. 4 is another block diagram illustrating the relationship between logical block numbers and the physical blocks of buffer 218.
FIG. 5 is a block diagram showing an index entry of index table 212.

FIG. 4 is a block diagram showing a relationship between logical block numbers and the physical blocks of buffer 218, as shown in FIG. 3. In particular, FIG. 4 shows buffer 218 laid out as a series of blocks numbered 0 through N−1. Consecutive block numbers represent consecutive respective blocks in buffer 218, and are managed by buffer controller 214 to form a cyclic buffer. The two rows of consecutive logical block numbers N through 2N−1 and 2N through 3N−1 map to respective blocks of buffer 218. Thus, at any one time, N of the logical block numbers map respectively to N blocks, as illustrated in FIG. 3.

Logical Block Index

FIG. 5 is a block diagram showing an index entry of index table 212. Each index entry is comprised of a key field 510, a size field 512 and a logical block number field 514. Key 510 comprises information identifying particular information stored in buffer 218. For example, the identification may be in the format of a uniform resource locator (URL). Size field 512 comprises information defining the size of a particular group of information stored in buffer 218, and block number 514 is a logical block number corresponding to a physical block stored in buffer 218. Block number 514 may be, for example, a 32-bit number which is translated to a physical block number of a block in buffer 218.

A logical block number 514 is used in index table 212 to identify the location of information in buffer 218. When information is stored to buffer 218, index table 212 must be updated to reflect the new information. When information is retrieved from buffer 218, index table 212 is used to determine, first, whether the information is stored in buffer 218 and, second, if so, the logical block number of the information. To access the block, the logical block number is translated to the corresponding physical buffer block number. These processes, and supporting apparatus will now be described in greater detail.

Insertion of Information

FIG. 6 is a flow chart showing the process of buffer controller 214 inserting information into buffer 218 that has been retrieved by proxy server controller 210 from network 116, using wraparound of input pointer IP when IP reaches a maximum value M. The value of IP is the number of the next available logical block where new information can be stored. Buffer controller 214 receives the URL and information corresponding to the URL from proxy server controller 210 (step 610). Buffer controller 214 then determines the size of the information (step 612), and the number of blocks in buffer 218 that are needed to store the information.

Maximum range M is used as an arbitrary limit on the size of the logical buffer to avoid the condition where input pointer IP reaches the highest number, $2^y-1$, and rolls over to zero. Maximum range M is an integer multiple of the buffer size N and is chosen so that $M+N>2^y-1$. It is possible that input pointer IP will reach maximum range M. This condition must be taken into account when managing the buffer.

If the old input pointer IP plus the number of blocks needed to store the information is not greater than maximum range M (determined in step 614), then the new input pointer IP is simply set to the old input pointer IP plus the number of blocks needed to store the information (step 616). The information is stored in consecutive blocks of buffer 218 starting with the block identified by the value of the old input pointer.

Buffer controller 214 then scans index table 212 to determine whether the URL has already been stored in index table 212 (step 622). If there is an entry in index table 212 that corresponds to the URL, the logical block number associated with that entry is replaced with the old input pointer number and new size for the information (step 624), and the process is completed. If there is no index entry corresponding to the URL in index table 212, a new index entry of the type shown in FIG. 5 is created (step 626), and the process is exited.

Buffer Accessing

FIG. 7 is a block diagram showing a portion of buffer controller 214 which retrieves information from buffer 218 in response to a request from proxy server controller 210. Buffer controller 214 is comprised of key resolver 710, logical block number validator 712, logical block number to physical block number map 714 (corresponding to map 310 of FIG. 3), and buffer access 716. Key resolver 710 receives a request, which includes a URL, from proxy server controller 210, and determines from index table 212 the block number corresponding to the URL. If the URL is not found in index table 212, an indication that the buffer does not contain the information is returned to proxy server controller 210 via path 718.

If key resolver 710 finds the URL in index table 212, it forwards the logical block number and size fields to logical block number validator 712. Logical block number validator 712 performs an algorithm on the logical block number to determine if the logical block number is within the window of valid logical block numbers currently being used to represent the blocks of buffer 218. If the logical block number is not within the window, an invalid indication is sent to proxy server controller 210 via path 720. If the logical block number is valid, the logical block number and size are transferred to logical block number to physical block number map 714, which resolves the logical block number into the corresponding physical block number of buffer 218. A divider 715 which converts a logical block number C into a physical block number by determining a remainder after dividing the block number C by the number of blocks N in the buffer (i.e C/N) may be utilized in the logical number to physical block number map 714. The physical block number and size are forwarded to buffer access 716. Buffer access 716 retrieves the information at the physical block number (and subsequent blocks, depending on the size field) from buffer 218 and returns the retrieved information to proxy server controller 210 via path 722.

FIG. 8 is a block diagram showing logical block number validator 712 in greater detail. Logical block number validator 712 comprises input pointer 810, buffer size 812, and logical block number range calculator or wraparound determiner 814. Logical block number range calculator 814 receives the logical block number (CN) and size corresponding to the URL found in index table 212 by key resolver 710. Based on the current input pointer 810 and buffer size 812, logical block number range calculator 814 determines whether the logical block number received from key resolver 710 is valid. The calculation uses input pointer (IP) 810 and buffer size (N) 812 to determine if the current logical block number CN is valid. CN must be in the window between the current input pointer and the buffer size, as shown by SLIDING WINDOW of FIG. 3.

Normally, input pointer IP is merely incremented each time data is added to the buffer. There are instances, however, when input pointer IP is not simply incremented. One instance is when input pointer IP is reset to N. This may occur in a variety of situations, such as when the system crashes, or when an arbitrary limit has been reached. Another instance when input pointer IP is not simply incremented is when input pointer IP reaches maximum range M, and wraps around to zero.

If the maximum range of logical block numbers is sufficiently large, the end of the logical cyclic buffer will likely never be reached. For example, if maximum range M is larger than the number of blocks that are needed during the lifetime of the equipment, arbitrary limit maximum range M will never be reached. If the size of a logical block number is represented as a 32-bit integer, then the maximum value of a logical block number is $2^{32}-1$, or about 4 billion. If 64-bit block numbers are used, it is very possible that the end of the logical cyclic buffer will never be reached.

Similarly, if the buffer is implemented so that input pointer IP is reset periodically, upon system crash, or upon some other event, then it is possible that maximum range M may never be reached. There are certain circumstances, however, when input pointer IP will need to be reset to the beginning of the buffer. In this case, buffer controller 214 periodically purges the entire index table by resetting the input pointer for logical blocks to the initial value of N. This effectively clears the buffer. For example, in FIG. 3, the sliding window denotes the set of valid logical block numbers, IP–N. If the current input pointer IP is much greater than N, by moving the sliding window to the beginning (i.e., the starting logical block number N), the current set of logical block numbers become obsolete.

In one embodiment, input pointer IP is managed in two ways depending upon the circumstances. In the first case, for example when input pointer IP is very near the size maximum range M of the logical buffer, when a new block is added, input pointer IP wraps around to the beginning of the buffer. In this case, input pointer IP will have a value between 0 and N. In the second case, for example when the system periodically resets input pointer IP, or resets input pointer IP upon system crash or some other event, input pointer IP might be reset to N.

Each of these ways of handling inputpointer IP, reset and wraparound, must be a taken into account when determining whether a request (REQ) is for a valid logical block number. More particularly, the determination of whether a logical block number is valid must take into account whether input pointer IP wraps around to zero, or is reset to N.

FIG. 9 is a flowchart showing the processing performed by logical block number validator 712. A wraparound condition is indicated by IP<N (determined in step 910). If IP<N, a requested current logical block number REQ is considered valid if it is either less than IP or greater than or equal to M–(N–IP) (step 914). In the second, non-wraparound case, when IP>=N, the current logical block number REQ is valid if its value is greater than or equal to IP–N and less than IP (step 912).

Depending on the outcome of the check, logical block number validator 712 returns a valid (step 916) or invalid (step 918) indication. If the logical block number is not valid, logical block number validator 712 provides an invalid indication over path 720 (FIG. 8) to proxy server controller 210. If the logical block number is valid, the logical block number and size are forwarded to logical block number to physical block number map 714 to resolve the logical block number into a physical buffer block number.

In summary, conventional cyclic buffers require a generation number and a block number of a block in order to determine the validity and freshness of the block. Apparatus and methods consistent with the principles of the invention disclosed herein simplify conventional generation and block numbers into one logical block number that is used for determining the validity and freshness of a block, thus resulting in simpler cyclic buffer algorithms.

Conclusion

It will be apparent to those skilled in the art that various modifications and variations can be made in the network access apparatus and methods consistent with the principles of the present invention without departing from the scope or spirit of the invention. Although several embodiments have been described above, other variations are possible within the spirit and scope consistent with the principles of the present invention.

Although the invention has been described in terms of a circular buffer, the principles may be applied to any type of buffer. The flexibility of logical blocks reduces the complexity of overhead processing required by conventional buffering systems.

The logical block buffer disclosed herein may also be used in environments other than a proxy server. For example, the logical block buffer may be used in any environment where a buffer is needed.

The apparatus disclosed herein should be understood to support the processes performed thereby, and, similarly, the processes disclosed herein should be understood to support the apparatus necessary to perform the steps of the processes. It should be further understood that the apparatus and methods disclosed herein may be implemented entirely in hardware, entirely in software operating on a hardware platform, or a mixture of hardware and software.

The apparatus and method consistent with the present invention and disclosed herein are related to the maintenance and use of a cyclic buffer. The buffer may be implemented in whole or in part by one or more sequences of instructions, executed by proxy server 110, which carry out the apparatus and method described herein. Such instructions may be read by proxy server 110 from a computer-readable medium, such as a storage device. Execution of sequences of instructions by proxy server 110 causes performance of process steps consistent with the present invention described herein. Execution of sequences of instructions by proxy server 110 may also be considered to implement apparatus elements that perform the process steps. Hard-wired circuitry may be used in place of or in combination with software instructions to implement the invention. Thus, embodiments of the invention are not limited to any specific combination of hardware circuitry and software.

The term "computer usable medium" as used herein refers to any medium that may store instructions for execution. Such a medium may take many forms, including but not limited to, non-volatile memory media, volatile memory media, and transmission media. Non-volatile memory media includes, for example, optical or magnetic disks. Volatile memory media includes random access memory (RAM). Transmission media includes, for example, coaxial cables, copper wire and fiber optics, including the wires. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic storage medium, a compact disc read only memory (CD-ROM), any other optical medium, punchcards, papertape, any other physical medium with patterns of holes, a RAM, a programmable read only memory (PROM), an erasable programmable read only memory (EPROM), a FLASH-EPROM, any other memory chip or cartridge, a carrier wave as described hereinafter, or any other medium from which a computer can read and use.

Various forms of computer readable media may be involved in carrying one or more sequences of instructions for execution to implement all or part of the cyclic buffer described herein. For example, the instructions may initially be carried on a magnetic disk or a remote computer. The remote computer can load the instructions into its dynamic memory and send the instructions over a telephone line using a modem. A modem local to a computer system can receive the data on the telephone line and use an infra-red transmitter to convert the data to an infra-red signal. An infra-red detector coupled to appropriate circuitry can receive the data carried in the infra-red signal and place the data on a bus. The bus may carry data to a memory, from which a processor retrieves and executes the instructions. The instructions received by the memory may optionally be stored on a storage device either before or after execution by the processor.

Other embodiments of the invention will be apparent to those skilled in the art from consideration of the specification and practice of the disclosed embodiments. The specification and examples are exemplary only, and the true scope and spirit of the invention are defined by the following claims and their equivalents.

We claim:

1. Apparatus for retrieving information from a buffer, comprising:
   a receiver for receiving a request for information from the buffer;
   a determiner for determining a logical block number associated with the request;
   a translator for translating the logical block number to a physical block number of the buffer; and
   a buffer accessor for accessing the information using the physical block number.

2. The apparatus according to claim 1, wherein the determiner comprises:
   a store for storing an index to the buffer; and
   an index accessor for accessing the index to determine the logical block number associated with the request.

3. The apparatus according to claim 1, further comprising:
   a validator for validating the logical block number.

4. The apparatus according to claim 3, wherein the validator comprises:
   a range device for determining whether the logical block number is within a range of logical block numbers currently defining the buffer.

5. The apparatus according to claim 4, wherein the validator further comprises:

an input pointer store for storing an input pointer defining a logical block number representing the next block to hold information; and
   an indicator store for storing an indicator of the size of the buffer.

6. The apparatus according to claim 1, wherein the translator comprises:
   a divider for dividing a logical block number by the buffer size expressed in blocks.

7. Apparatus for storing information in a buffer, comprising:
   a request receiver for receiving a request to store information in the buffer;
   a selector for selecting a buffer block for storing the information based on a logical block number input pointer; and
   a storer for storing the information in the buffer block.

8. The apparatus according to claim 7, wherein the selector comprises:
   means for calculating a physical block number from the logical block number input pointer.

9. The apparatus according to claim 7, further comprising:
   a logical block store for storing a logical block number corresponding to the buffer block.

10. The apparatus according to claim 9, wherein the logical block store comprises:
    a key resolver determining whether an index entry corresponding to the information is already stored in the index.

11. The apparatus according to claim 7, further comprising:
    a size determiner for determining a number of blocks necessary to store the information in the buffer; and
    a logical block number input pointer setter for setting the next logical block number input pointer to a new number based on the number of blocks necessary to store the information in the buffer.

12. A buffer management method, comprising:
    receiving a request for information from a buffer;
    determining a logical block number associated with the request;
    translating the logical block number to a physical block number of the buffer; and
    retrieving the information using the physical block number.

13. The method according to claim 12, wherein determining a logical block number includes:
    accessing a stored index to determine the logical block number associated with the request.

14. The method according to claim 12, further including:
    validating the logical block number.

15. The method according to claim 14, wherein validating the logical block number includes:
    determining whether the logical block number is within a range of logical block numbers currently defining the buffer.

16. The method according to claim 14, wherein the validating includes determining whether a wraparound has occurred.

17. The method according to claim 16, wherein the validating further includes determining whether a request is valid in accordance with whether a wraparound condition has occurred.

18. The method according to claim 12, wherein translating the logical block number includes:

dividing a logical block number by the buffer size expressed in blocks.

19. A buffer management method comprising the steps of:
receiving a request to store information in the buffer;
selecting a buffer block for storing the information based on a logical block number input pointer; and
storing the information in a buffer block.

20. The method according to claim 19, wherein the step of selecting a buffer block includes a step of:
calculating a physical block number from the logical block number input pointer.

21. The method according to claim 19, further including the step of:
storing a logical block number corresponding to the buffer block.

22. The method according to claim 21, wherein the step of storing a logical block number includes the step of:
determining whether an index entry corresponding to the information is already stored in the index.

23. The method according to claim 19, further including the step of:
determining a number of blocks necessary to store the information in the buffer.

24. The method according to claim 23, further including the step of:
setting the logical block number input pointer to a new number based on the number of blocks necessary to store the information in the buffer.

25. A computer program product comprising:
a computer usable medium having computer readable code embodied therein for managing a buffer, the computer usable medium comprising:
a receiving module configured to receive a request for information from the buffer;
a determining module for determining a logical block number associated with the request;
a translating module for translating the logical block number to a physical block number of the buffer; and
a retrieving module for retrieving the information using the physical block number.

26. The computer program product according to claim 25, wherein the determining module comprises an accessing module for accessing a stored index to determine the logical block number associated with the request.

27. The computer program product according to claim 26, further comprising:
a validating module for validating the logical block number.

28. The computer program product according to claim 27, wherein the validating module comprises:
a wraparound determiner module for determining whether a wraparound has occurred.

29. The computer program product according to claim 27, wherein the validating module further comprises:
a determining module for determining whether the logical block number is within a range of logical block numbers currently defining the buffer.

30. The computer program product according to claim 25, wherein the translating module comprises:
a dividing module for dividing a logical block number by the buffer size expressed in blocks.

31. A computer program product comprising:
a computer usable medium having computer readable code embodied therein for managing a buffer, the computer usable medium comprising:
a receiving module for receiving a request to store information in the buffer;
a selecting module for selecting a buffer block for storing the information based on a logical block number input pointer; and
a storing module for storing the information in the buffer block.

32. The computer program product according to claim 31, wherein the selecting module comprises:
a calculating module for calculating a physical block number from the logical block number input pointer.

33. The computer program product according to claim 31, further comprising:
a storing module for storing a logical block number corresponding to the buffer block.

34. The computer program product according to claim 33, comprising:
a determining module for determining whether an index entry corresponds to the information already stored in the index.

35. The computer program product according to claim 31, further comprising:
a determining module for determining a number of blocks necessary to store the information in the buffer.

36. The computer program product according to claim 35, further comprising:
a setting module for setting the logical block number input pointer to a new number based on the number of blocks necessary to store the information in the buffer.

* * * * *

UNITED STATES PATENT AND TRADEMARK OFFICE
CERTIFICATE OF CORRECTION

PATENT NO.     : 6,807,615 B1
DATED          : October 19, 2004
INVENTOR(S)    : Thomas K. Wong et al.

It is certified that error appears in the above-identified patent and that said Letters Patent is hereby corrected as shown below:

Column 12,
Line 47, "anew" should read -- a new --.

Signed and Sealed this

Fourth Day of January, 2005

JON W. DUDAS
*Director of the United States Patent and Trademark Office*